United States Patent [19]

Dickson et al.

[11] 4,404,054

[45] Sep. 13, 1983

[54] METHOD FOR APPLYING SEALANT BETWEEN FAYING SURFACES OF AIRCRAFT WING STRUCTURES

[75] Inventors: Jerald L. Dickson, Kirkland; Harvey E. Green, Jr., Pacific, both of Wash.

[73] Assignee: The Boeing Company, Seattle, Wash.

[21] Appl. No.: 282,117

[22] Filed: Jul. 10, 1981

Related U.S. Application Data

[62] Division of Ser. No. 189,281, Sep. 22, 1980.

[51] Int. Cl.$^3$ .............................................. B32B 7/08

[52] U.S. Cl. ................................ 156/92; 29/526 R; 29/DIG. 1; 118/306; 118/410; 156/291; 156/295; 156/548; 156/575; 156/578; 222/330; 222/478; 244/132; 244/133; 401/193; 401/266

[58] Field of Search ............... 118/305, 306, 410, 411; 156/548, 575, 578, 91, 295, 291, 92; 222/323, 330, 478; 244/132, 131, 133; 401/193, 261, 266; 29/526 A, 526 R, DIG. 1; 428/137

[56] References Cited

U.S. PATENT DOCUMENTS

| | | | |
|---|---|---|---|
| 2,555,563 | 6/1951 | Benton | 222/330 X |
| 2,925,193 | 2/1960 | Gibb | 156/91 X |
| 3,099,582 | 7/1963 | Ongstad et al. | 156/578 X |
| 3,155,544 | 11/1964 | McConnell et al. | 118/410 |
| 4,157,149 | 6/1979 | Moen | 222/330 X |

*Primary Examiner*—Robert A. Dawson
*Attorney, Agent, or Firm*—Conrad O. Gardner; B. A. Donahue; Nicolaas DeVogel

[57] ABSTRACT

A fay surface sealing tool for applying sealant between wing skin and spar chord joints prior to fastener installation. The fay surface sealing tool includes a plurality of plurality of spaced apartures for dispensing the sealant in bead form between each row of fastener holes and on each edge margin subsequent to joint opening.

2 Claims, 4 Drawing Figures

METHOD FOR APPLYING SEALANT BETWEEN FAYING SURFACES OF AIRCRAFT WING STRUCTURES

This is a division of application Ser. No. 189,281, filed Sept. 22, 1980.

This invention relates to methods and apparatus for sealing surfaces together prior to joining by fasteners, and more particularly to application of adhesive in limited access areas as between the faying surfaces of aircraft wing structures, e.g spar and wing skin.

An obvious approach to application of adhesive would be by single nozzle directed into the limited area. However, such application between the faying surfaces of aircraft wing structures is not facilitated by the limited separation of these surfaces of only about one-fourth inch.

Plural spout dispensing apparatus are generally known as exemplified by U.S. Pat. No. 2,555,563 to Benton issued June 5, 1951, albeit an oil can application of such configuration.

A portable roofing apparatus as shown in U.S. Pat. No. 3,099,582 to Ongstad et al. issued July 30, 1963 shows application of an adhesive material to a limited access region in a roof structure.

Accordingly, it is an object of the present invention to provide means for applying sealant to plural spaced locations in limited access areas wherein faying surfaces are to be joined.

It is another object of the present invention to provide apparatus for fay sealing wing skin and spar chord joints of an aircraft wing structure.

It is yet another object of this invention to provide a method for sealing wing skin and spar chord joints by depositing sealant in bead form in the open joint of an aircraft wing structure utilizing a fastener hole locator for guidance of bead deposits.

It is still another object of the present invention to provide a u-shaped tube having a flattened portion with spaced apertures for dispensing a sealant in bead form for use in limited access areas.

These and other objects and advantages of this invention will be readily apparent from the following detailed description of an embodiment thereof and accompanying drawings wherein.

Figure 1:
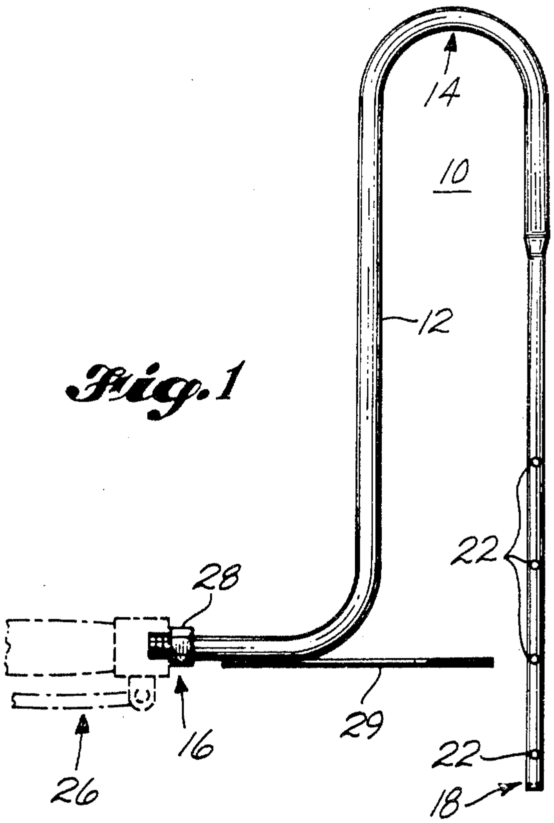
FIG. 1 is a side elevational view of a preferred embodiment of the present fay surface sealing tool.
Figure 2:
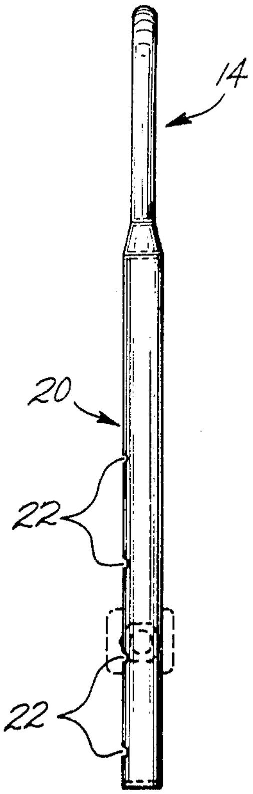
FIG. 2 is an end elevation of the fay surface sealing tool of FIG. 1.

Turning now to FIG. 1, fay surface sealing tool 10 will be seen to include a tubular-shaped member 12 having a u-shaped portion 14 intermediate end portions 16 and 18 thereof. End portion 18 of tubular-shaped member 12 is seen to terminate in a thin profiled flattened portion 20 containing a plurality of spaced apertures 22 for allowing sealant flowing through tubular-shaped member 12 to be dispersed in bead form (as seen in more detail in FIG. 4). Aperture 22 spacing is dependent upon fastener hole spacing and joint width (as also seen in more detail in FIG. 4).

Figure 3:
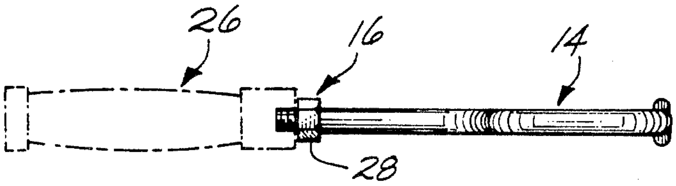
FIG. 3 is a top plan view of the sealing tool of FIG. 1.

Sealant is supplied through threaded end portion 16 (as seen in FIG. 3) from pneumatic cartridge gun 26 coupled to threaded end portion 16. Coupling of cartridge gun 26 is stopped by nut 28 surrounding tubular-shaped member 12 upon achievement of the predetermined desired degree of coupling onto threaded end portion 16.

Figure 4:
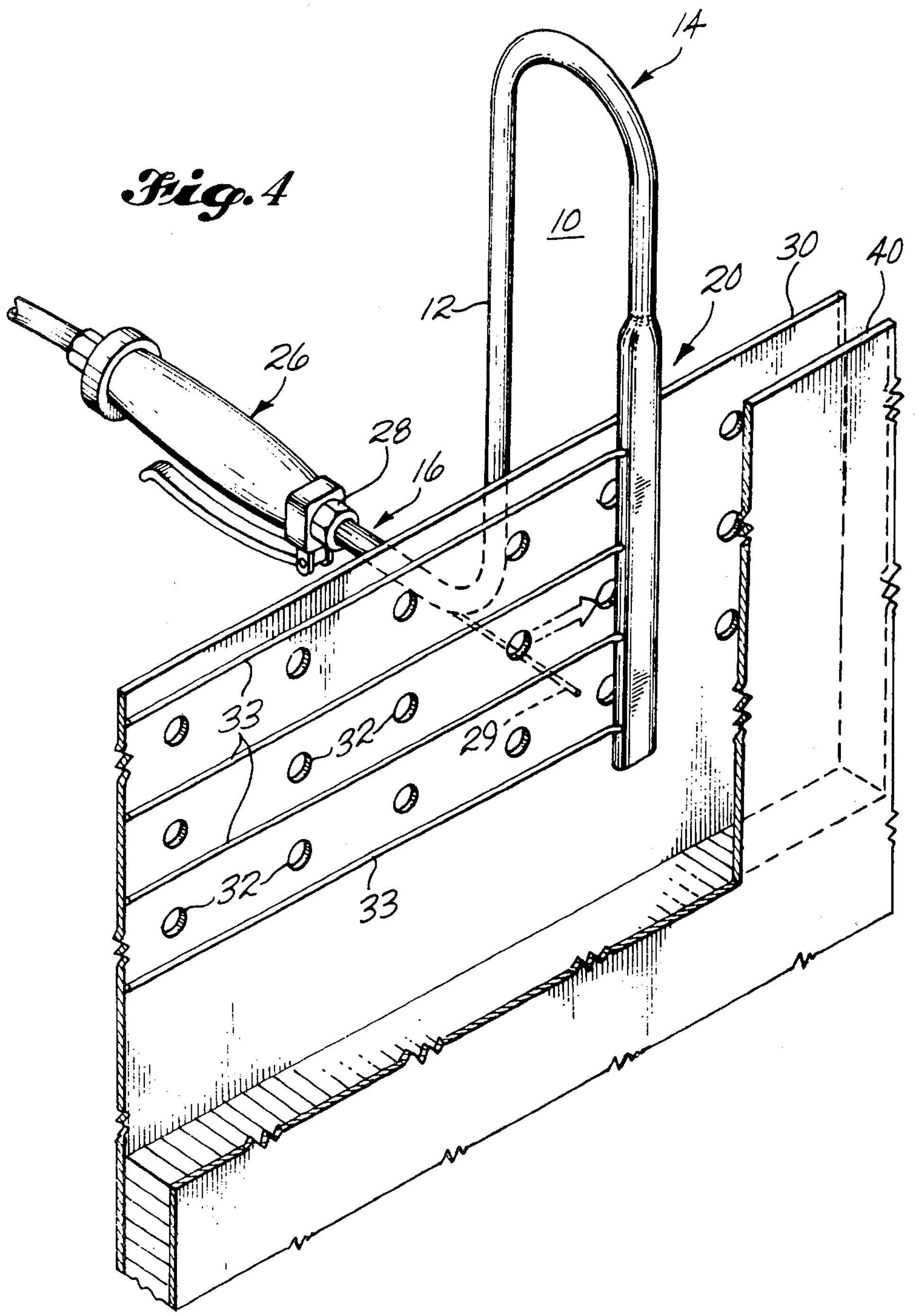
FIG. 4 is a view in perspective of the fay surface sealing tool of FIGS. 1 to 3 as utilized in the method of sealing wing skin and spar chord joints of an aircraft wing.

Turning now to FIG. 4, it will be observed that the wing skin—spar chord joint formed between wing skin 30 spar chord 40 can only be opened to provide limited access in this aircraft wing structure, less than one inch, e.g. about one-quarter inch. An operator, utilizing fay surface sealing tool 10, while utilizing pneumatic cartridge gun 26 to control sealant flow, disposes rod-like guide 29 in a predetermined portion outside the wing skin—spar chord joint along e.g. a line of fastener holes 32 to distribute bead lines 33 of sealant along between corresponding rows of fastener holes in a joint wall, e.g. wing skin 30. Insertion of thin profiled flattened portion 20 between wing skin 30 and spar chord 40 subsequent to the step of opening the joint and subsequent movement thereof to deposit a bead of sealant between each row of fastener holes and on each edge margin leads to the next step of withdrawal of thin profiled flattened portion 20 of tool 10 from the joint. The final step in providing a finished wing skin—spar chord joint comprises fastener installation between wing skin 30 and spar chord 40 thereby causing the plurality of corrosion inhibitant sealant bead lines 33 to spread out into a continuous film completing the fay sealed joint.

We claim:

1. In the method of fastening together a wing skin and a spar chord of an aircraft wing structure, the improvement comprising:

opening the joint formed by said wing skin and spar chord a predetermined distance prior to installation of a plurality of fasteners therebetween;

inserting in the opening a thin profiled flattened end portion of a sealing tool, said tool comprising a u-shaped portion intermediate said end portion and a first end portion having means for receiving sealant from a sealant source with said flattened portion having a plurality of apertures distributed therealong in predetermined spaced apart relationship;

simultaneously depositing a plurality of beads of sealant through said apertures and between corresponding rows of fastener holes; and withdrawing said end portion and closing said joint by installation of said plurality of fasteners between said wing skin and spar chord thereby spreading out said plurality of beads of sealant.

2. The method of claim 1 further including the step of moving guide means along a straight line exterior to said joint and parallel with said rows of fastener holes to simultaneously deposit said plurality of beads of sealant between corresponding rows of fastener holes.

* * * * *